United States Patent [19]
Miner et al.

[11] Patent Number: 4,884,314
[45] Date of Patent: Dec. 5, 1989

[54] PORTABLE BLOWER

[75] Inventors: Jonathan L. Miner, Timonium; Vernon R. Lacher, Fallston; Gerald J. Rescigno, Baltimore, all of Md.; William B. Swim, Cookeville, Tenn.; Martin P. Gierke; David A. Hahn, both of Baltimore, Md.

[73] Assignee: Black & Decker Inc., Newark, Del.

[21] Appl. No.: 119,491

[22] Filed: Nov. 12, 1987

[51] Int. Cl.⁴ ............................................. A47L 5/14
[52] U.S. Cl. ........................................ 15/344; 15/405; 15/410; 15/413; 15/419; 415/210.1; 417/234; 417/366; 417/411
[58] Field of Search ................. 15/405, 344, 410, 413; 417/234, 366, 411; 310/47, 50; 415/207, 210

[56] References Cited

U.S. PATENT DOCUMENTS

| | | | |
|---|---|---|---|
| 881,879 | 3/1908 | Boegel | 15/421 |
| 953,825 | 4/1910 | Gekeler | 15/421 |
| 1,106,231 | 8/1914 | Marshall | 15/421 X |
| 1,860,884 | 5/1932 | Bilde | 417/423 A X |
| 1,887,600 | 11/1932 | Replogle | 15/347 X |
| 1,966,787 | 7/1934 | Buri | 415/119 |
| 2,019,895 | 11/1935 | Dow | 15/412 X |
| 2,064,587 | 12/1936 | Carlstedt | 15/347 X |
| 2,121,073 | 5/1938 | De Bothezat | 417/247 |
| 2,175,641 | 10/1939 | Replogle | 417/247 |
| 2,218,035 | 10/1940 | Benson | 15/347 X |
| 2,360,155 | 10/1944 | Nuffer et al. | 15/344 |
| 2,441,239 | 5/1948 | Flanders | 415/210 |
| 2,576,368 | 11/1951 | Steiner | 15/402 X |
| 2,586,145 | 2/1952 | Breuer et al. | 15/330 X |
| 2,598,499 | 5/1952 | Breuer et al. | |

(List continued on next page.)

FOREIGN PATENT DOCUMENTS

| | | |
|---|---|---|
| 0097654 | 1/1984 | European Pat. Off. . |
| 0215165 | 3/1987 | European Pat. Off. . |
| 973853 | 6/1960 | Fed. Rep. of Germany . |
| 1628301 | 7/1967 | Fed. Rep. of Germany . |
| 6912018 | 3/1969 | Fed. Rep. of Germany . |
| 2236723 | 2/1974 | Fed. Rep. of Germany . |
| 2400433 | 7/1975 | Fed. Rep. of Germany . |
| 2529816 | 1/1977 | Fed. Rep. of Germany . |
| 2529817 | 1/1977 | Fed. Rep. of Germany . |
| 7630477 | 1/1977 | Fed. Rep. of Germany . |
| 2754304 | 6/1979 | Fed. Rep. of Germany . |
| 2900983 | 7/1979 | Fed. Rep. of Germany . |
| 3022477 | 5/1982 | Fed. Rep. of Germany . |
| 3042431 | 6/1982 | Fed. Rep. of Germany . |
| 3141245 | 4/1983 | Fed. Rep. of Germany . |
| 8318802 | 1/1984 | Fed. Rep. of Germany . |
| 3228491 | 2/1984 | Fed. Rep. of Germany . |
| 3429319 | 2/1986 | Fed. Rep. of Germany . |
| 3429565 | 2/1986 | Fed. Rep. of Germany . |
| 3538049 | 5/1986 | Fed. Rep. of Germany . |
| 3540898 | 5/1986 | Fed. Rep. of Germany . |
| 3518426 | 11/1986 | Fed. Rep. of Germany . |
| 1433722 | 12/1966 | France . |
| 1546750 | 11/1968 | France . |
| 2386706 | 12/1978 | France . |
| 58-77198 | 5/1983 | Japan ................................ 415/208 |
| 58032 | 8/1946 | Netherlands . |
| 1251880 | 11/1971 | United Kingdom . |
| 1292554 | 10/1972 | United Kingdom . |
| 1563382 | 3/1980 | United Kingdom . |
| 2124303 | 2/1984 | United Kingdom . |
| 2165002 | 4/1986 | United Kingdom . |
| 2185074 | 7/1987 | United Kingdom . |

OTHER PUBLICATIONS

West German publication "Lufter-Programm".
West Product D-100, pp. 57–59, 70–87.
Introduction to Fluid Mechanics, 2d Ed. 1978, Fox & McDonald, pp. 42–44.

*Primary Examiner*—Chris K. Moore
*Attorney, Agent, or Firm*—Harness, Dickey & Pierce

[57] ABSTRACT

A portable rechargeable battery-operated slender tubular blower for removing relatively light debris from hard surfaces such as sidewalks, driveways, decks or workbench surfaces. The blower uses an axial flow blower fan arranged for noise minimization and energy efficient operation. Blower tube inlet and outlet portions are arranged for debris removal effectiveness by optimizing airflow volume and velocity parameters.

79 Claims, 8 Drawing Sheets

U.S. PATENT DOCUMENTS

| | | | |
|---|---|---|---|
| 2,650,752 | 9/1953 | Hoadley | 415/210 X |
| 2,711,554 | 6/1955 | Doyle | 15/419 |
| 2,749,024 | 6/1956 | Wilfert | 415/119 |
| 2,879,530 | 3/1959 | Ego | 15/410 |
| 2,936,041 | 5/1960 | Sharp et al. | 181/47 |
| 2,969,559 | 1/1961 | Landis | 15/344 X |
| 2,978,733 | 4/1961 | Wahlborg | 15/421 |
| 3,080,599 | 3/1963 | Carlberg et al. | 15/421 |
| 3,083,893 | 4/1963 | Dean | 417/247 |
| 3,099,386 | 7/1963 | Pieper | 417/411 |
| 3,173,604 | 3/1965 | Sheets et al. | 415/210 X |
| 3,407,431 | 10/1968 | Melnik | 15/344 |
| 3,439,204 | 4/1969 | Ponczek et al. | 417/411 |
| 3,477,087 | 11/1969 | Robinson | 15/344 |
| 3,508,729 | 4/1970 | Wilson | 248/604 |
| 3,561,883 | 2/1971 | Berry | 415/131 |
| 3,647,323 | 3/1972 | Thomas | 417/411 |
| 3,999,243 | 12/1976 | La Pour | 15/344 |
| 4,044,750 | 8/1977 | Zeigler | 417/411 |
| 4,074,458 | 2/1978 | Catlett | 15/344 X |
| 4,132,507 | 1/1979 | Akiyama et al. | 417/234 |
| 4,209,875 | 7/1980 | Pugh et al. | 15/344 |
| 4,219,325 | 8/1980 | Gutzwiller | 415/210 |
| 4,253,634 | 3/1981 | Daniels | 248/604 |
| 4,269,571 | 5/1981 | Shikutani et al. | 417/234 |
| 4,288,886 | 9/1981 | Siegler | 15/405 X |
| 4,335,646 | 6/1982 | Jacquet et al. | 417/424 X |
| 4,342,929 | 8/1982 | Horne | 310/50 X |
| 4,373,696 | 2/1983 | Dochterman | 248/604 |
| 4,413,371 | 11/1983 | Juggle et al. | 15/405 |
| 4,516,561 | 5/1985 | Stawski et al. | 417/411 |
| 4,536,914 | 8/1985 | Levine | 15/344 |
| 4,542,557 | 9/1985 | Levine | 15/344 |
| 4,570,745 | 2/1986 | Sparks et al. | 181/200 X |
| 4,573,234 | 3/1986 | Kochte et al. | 15/323 |
| 4,615,069 | 10/1986 | Henning | 15/405 X |
| 4,643,776 | 2/1987 | Hollowell et al. | 15/339 X |
| 4,644,606 | 2/1987 | Luerken et al. | 15/330 |
| 4,663,799 | 5/1987 | Kiyooka | 15/330 |
| 4,692,091 | 9/1987 | Ritenour | 415/210 X |
| 4,694,528 | 9/1987 | Comer et al. | 15/330 |
| 4,734,017 | 3/1988 | Levin | 417/366 |

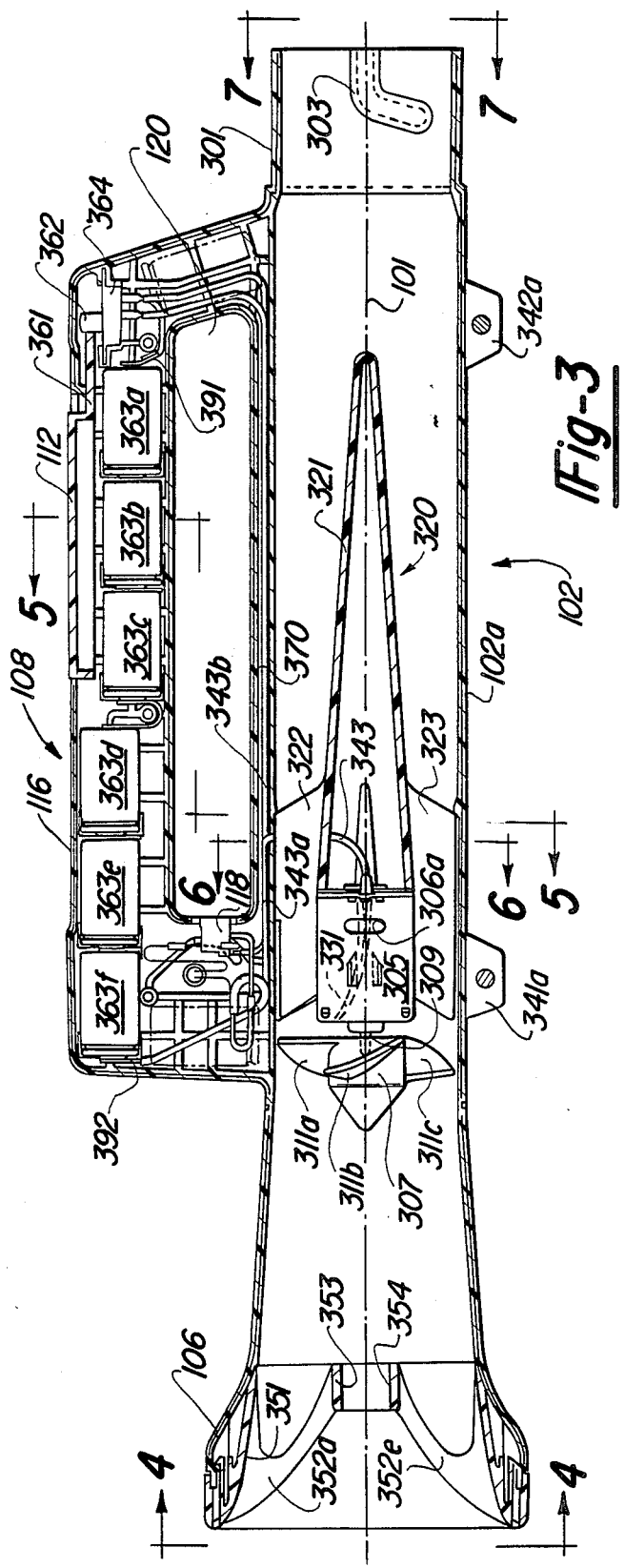
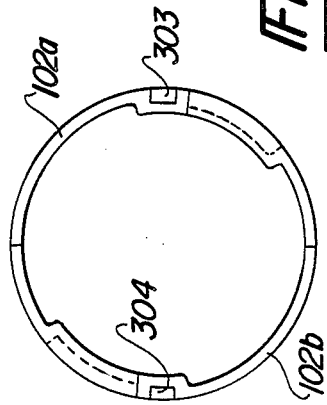
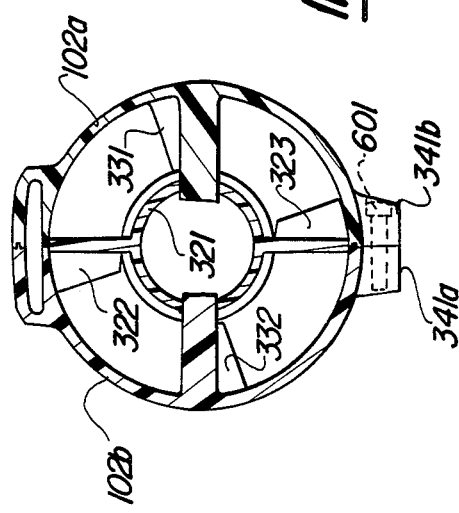

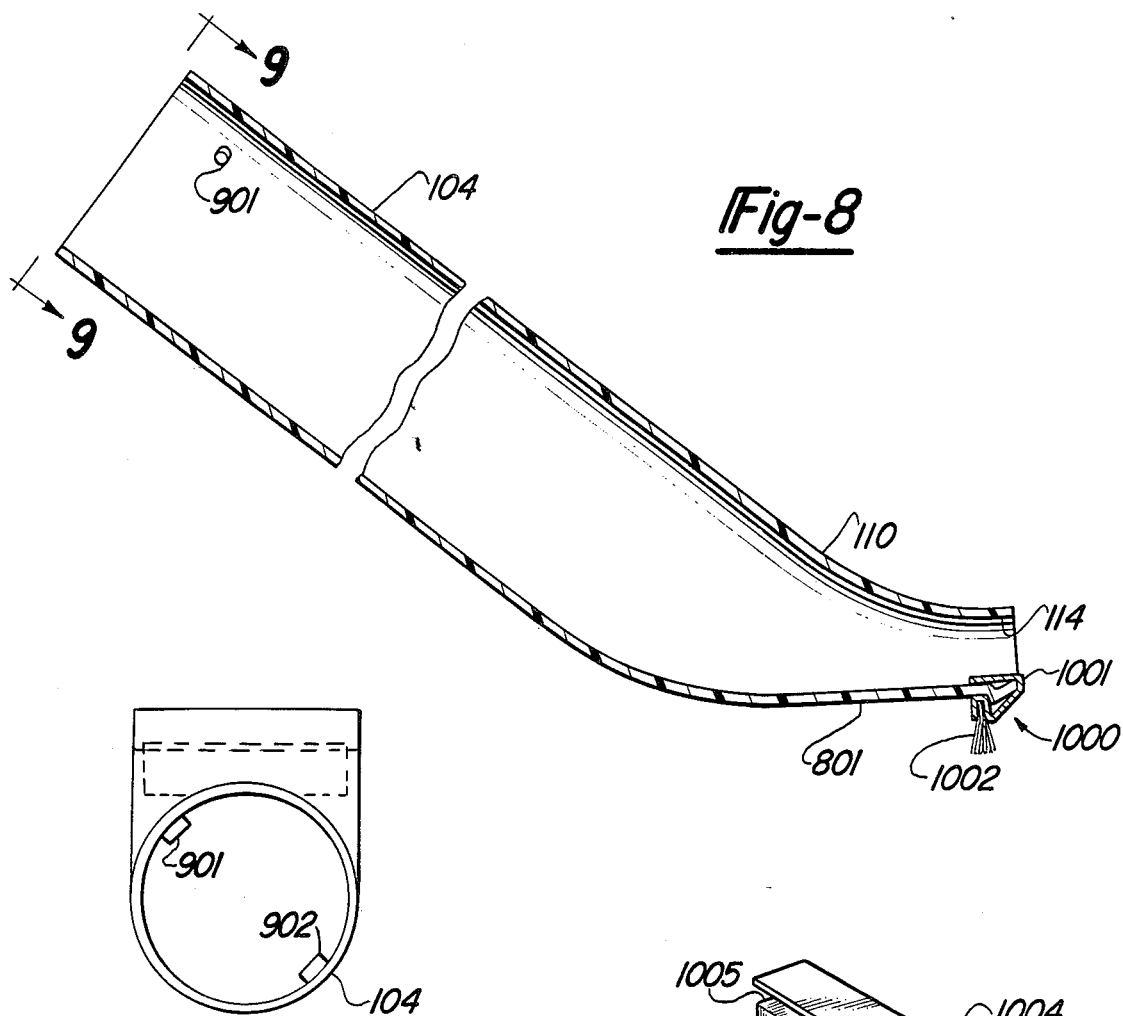
Fig-8
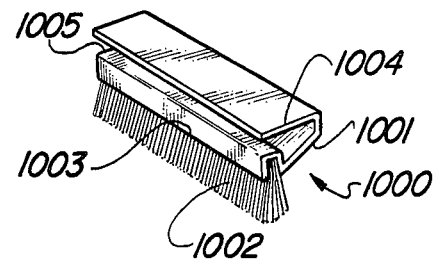
Fig-9
Fig-10

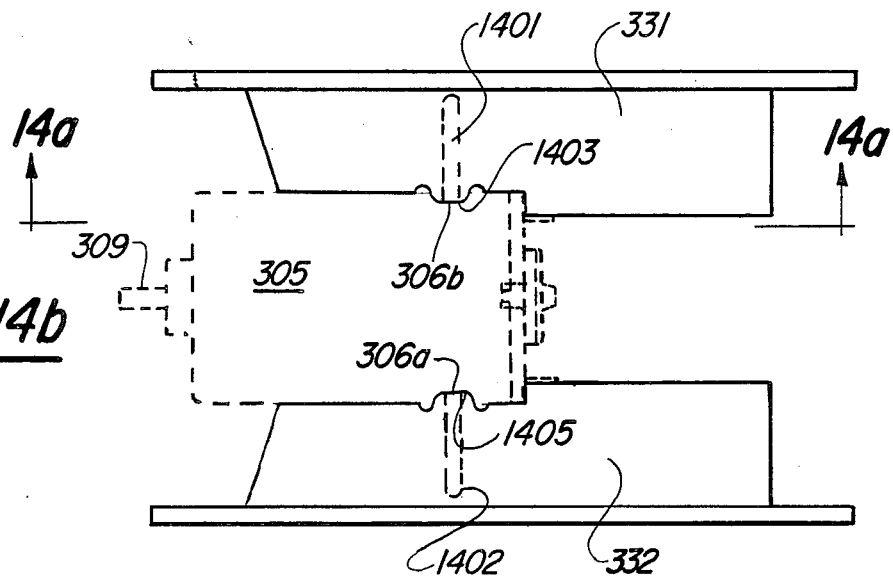
_Fig-14a_
_Fig-14b_
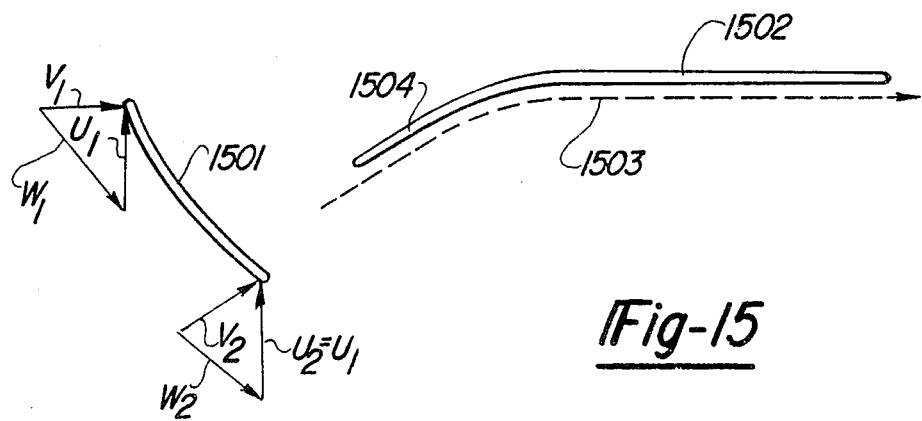
_Fig-15_

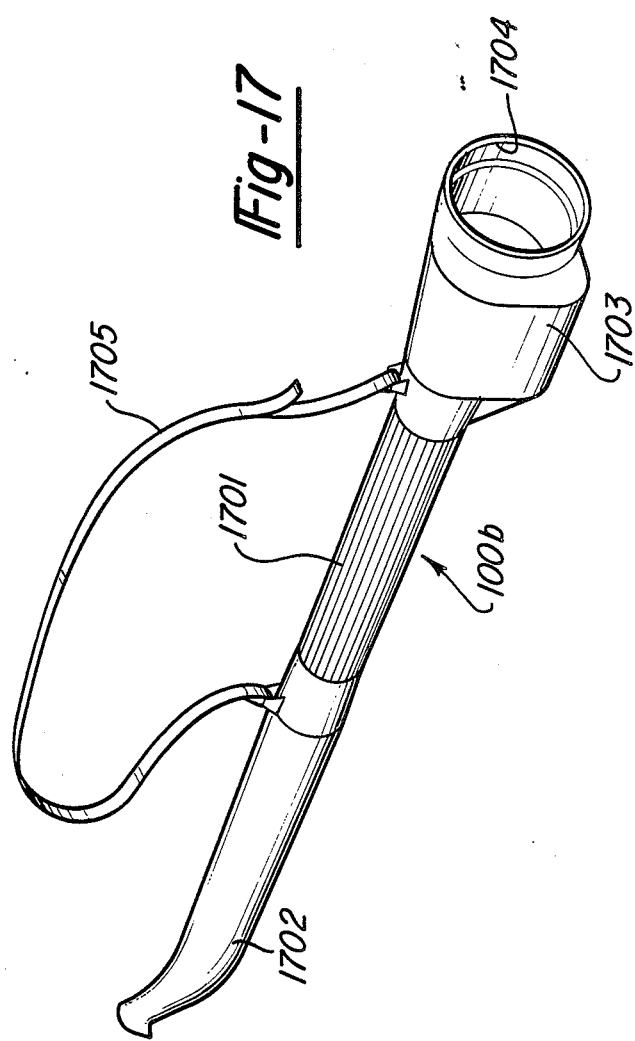
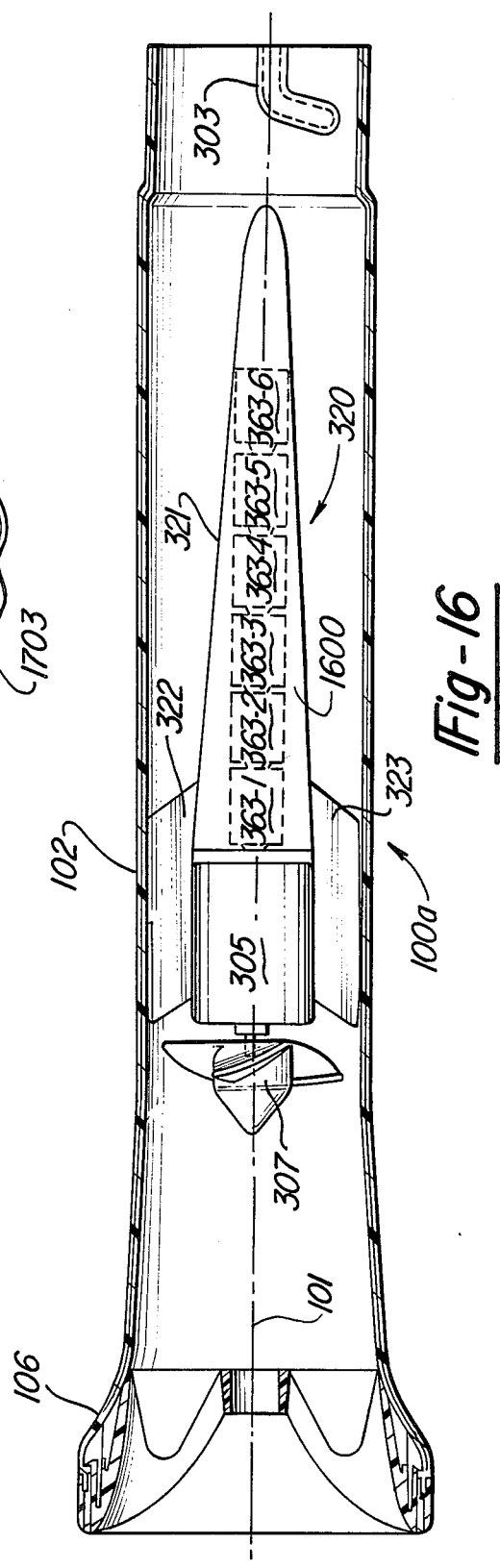

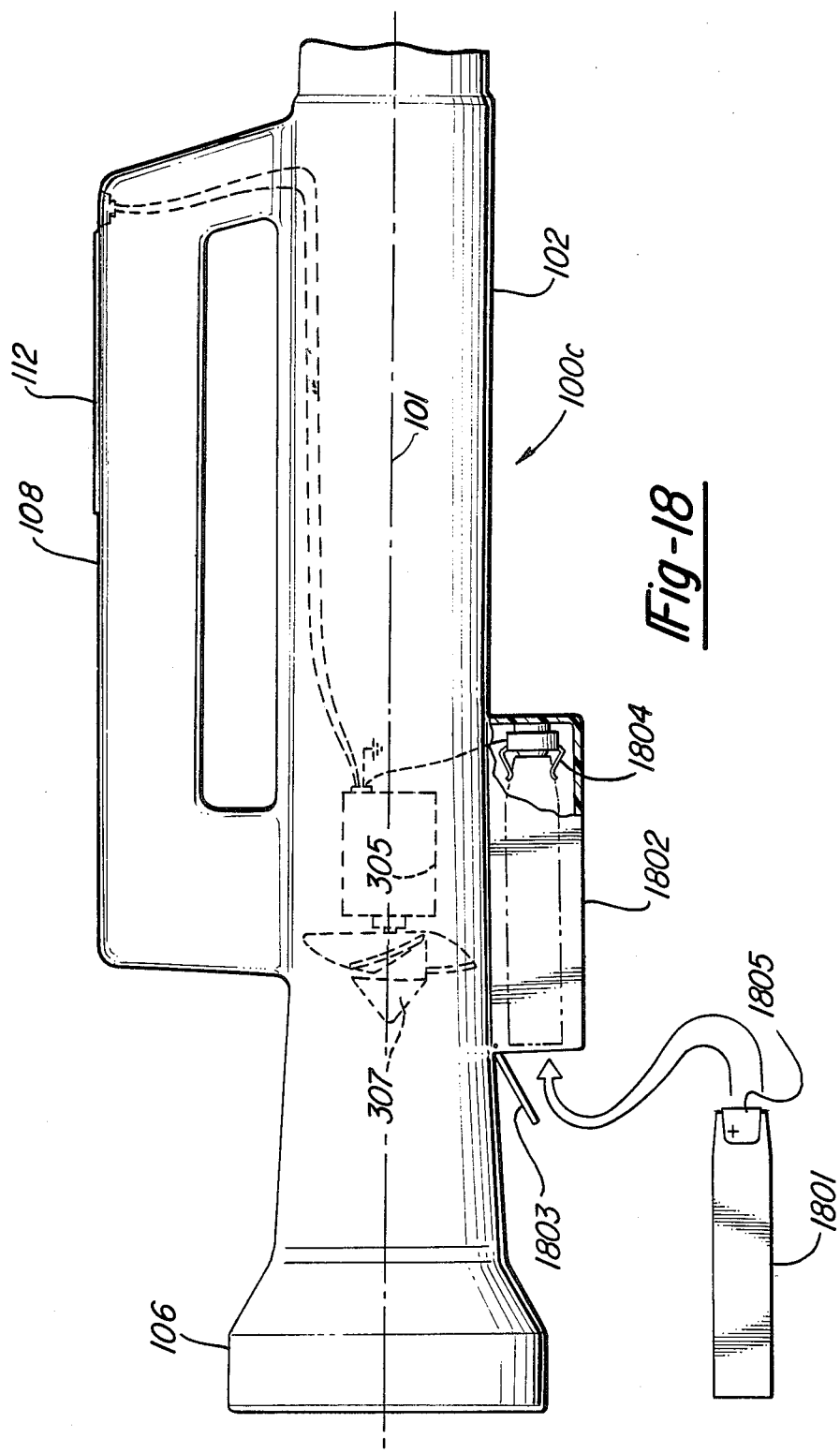

PORTABLE BLOWER

BACKGROUND OF THE INVENTION

The invention relates generally to blower apparatus for clearing various surface of debris. More specifically, the invention concerns lightweight, portable blowers utilizing axial fans and intended as replacements for conventional brooms or brushes.

Most conventional air blowers designed for use in clearing debris from a variety of work surfaces are either relatively heavy devices powered by internal combustion engines or relatively inconvenient and expensive corded electrical appliances. The last decade has seen the introduction of cordless, hand-held, lightweight household or vehicle power cleaning devices for supplementing the normal complement of corded, heavy-duty appliances, such as full-size vacuum cleaners, for a variety of lighter duty cleaning tasks. However, there remains a perceived absence of such cordless devices for lighter duty debris clearing functions presently performed by heavier duty powered blowers.

Various prior art blower designs have been proposed. Nevertheless, there remains a need to provide a lightweight, portable blower, preferably cordless, having a slender configuration with low noise, low vibration and energy efficient operation.

SUMMARY OF THE INVENTION

It is an object of the invention to fill the need for a lightweight, easy-to-use, portable blower for removing debris from a variety of work surfaces.

The invention contemplates portable blower apparatus having an elongate, tubular housing with inlet and outlet ends. A drive motor within the housing has a drive shaft extending substantially parallel to a longitudinal axis of the housing. Coupled to the drive shaft is at least one axially-directed fan arranged for moving air from the housing inlet to the housing outlet. Additionally, airflow directing and smoothing apparatus is positioned with respect to the drive motor and fan to maintain airflow substantially parallel to the longitudinal axis of the housing, and the fan is positioned at a predetermined distance from the housing inlet such that standing waves within the housing having predominate noise frequencies generated by the fan are prevented.

It is a feature of the invention that a portable blower is provided with improved airflow efficiencies enabling use of a battery-powered blower motor driving an axially-directed fan.

It is a further feature of the invention that it provides a lightweight blower held by the user in a normal walking position with the blower functioning in an ergonomic manner as a normal extension of the user's arm, with the outlet air of the blower being directed substantially parallel to the work surface.

It is a further feature of the invention that a blower designed in accordance therewith can be easily used by people of various heights.

It is still another feature of the invention that a blower is provided with effective airflow volume and speed, yet operates with a minimum of objectionable noise and vibration.

It is yet another feature of the invention that the apparatus used within the blower to direct and smooth airflow generated by the fan blower is also used to support the drive motor within the blower housing.

BRIEF DESCRIPTION OF THE DRAWING

These and other objects and features of the invention will become apparent from a reading of a detailed description of a preferred embodiment and alternative arrangements taken in conjunction with the drawing, in which:

FIG. 3 is a side cross-sectional view of the blower housing portion of the assembly of FIG. 1;

FIG. 6 is a view along the axis of the blower housing taken along line 6—6 of FIG. 3;

FIG. 7 is a view from the blower housing end opposite the inlet end taken along line 7—7 of FIG. 3;

FIG. 8 is a side cross-sectional view of the exhaust tube portion of the assembly of FIG. 1;

FIG. 9 is a view of the coupling end of the exhaust tube taken along line 9—9 of FIG. 8;

FIG. 10 is a perspective view of an optional brush attachment coupled to the exhaust nozzle of the exhaust tube of FIG. 8;

FIGS. 14a and 14b are side and top views, respectively, of an air straightening vane as it cooperates with a drive motor, the straightening vane being formed with or coupled to the blower housing wall;

FIG. 15 is a diagramatical view depicting airflow vectors into and out of a blower fan as such vectors relate to the cross-section of a straightening vane of the blower of the invention;

FIG. 16 is a side cross-sectional view of a first alternative embodiment wherein a separate handle is eliminated and the batteries for the blower are housed within a streamlining structure abutting the drive motor;

FIG. 17 is a perspective view of a second alternative embodiment having no separate handle and a special battery compartment integral with the housing yet maintaining the batteries clear of the generated airflow;

FIG. 18 is a side plan view of a third alternative embodiment employing a detachable, rechargeable battery pack for use with the blower assembly designed in accordance with the principles of the invention;

DETAILED DESCRIPTION

Figure 1:
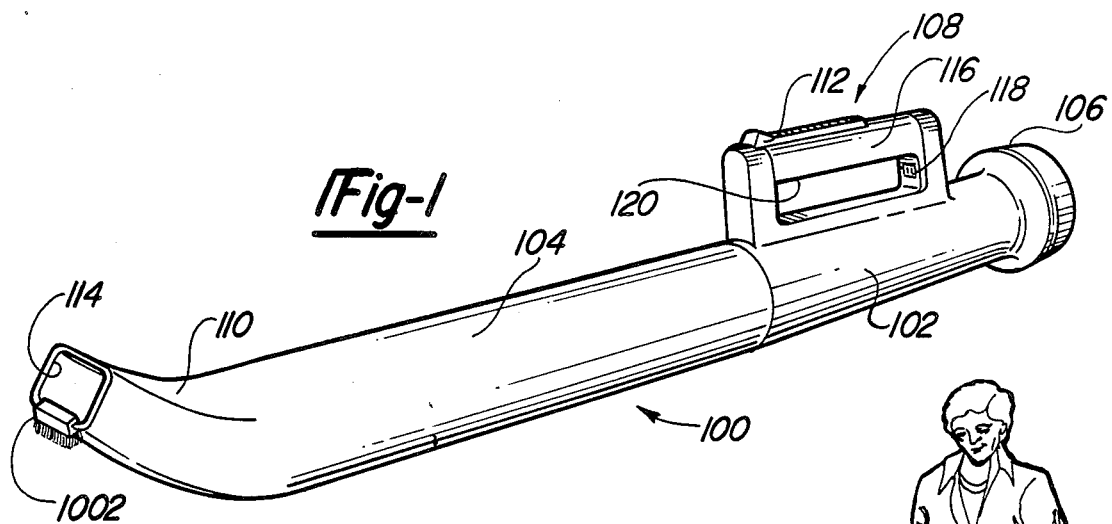
FIG. 1 is a perspective view of a preferred embodiment of a hand-held, cordless blower assembly arranged in accordance with the principles of the invention.

A preferred embodiment of a portable blower designed in accordance with the principles of invention is set forth in the perspective view of FIG. 1. Blower 100 has an elongate tubular housing comprised of a drive motor and fan housing portion 102 and an outlet or exhaust portion 104. Extending from housing portion 102 is a handle 108 providing a handle gripping portion 116 separated from the housing by an opening 120. At the outer surface of the handle grip portion 116 of handle 108 is an elongate sliding switch 112 used for applying power to the fan motor from a plurality of rechargeable batteries housed within the handle (not shown in this view but to be discussed below with reference to FIG. 3). The exhaust portion of the housing 104 is detachably coupled to housing portion 102 and is preferably angled as at 110 to provide an outlet nozzle opening 114. An optional brush attachment 1002 is mounted to the undersurface of the outlet nozzle. At the inlet end of the housing is a guard member 106 which is coupled to an enlarged inlet end of the housing for purposes to be discussed below. Finally, a jack 118 is provided in the handle portion of the housing for attachment to a source of charging energy for the rechargeable batteries used with the device in the preferred embodiment.

Figure 2:
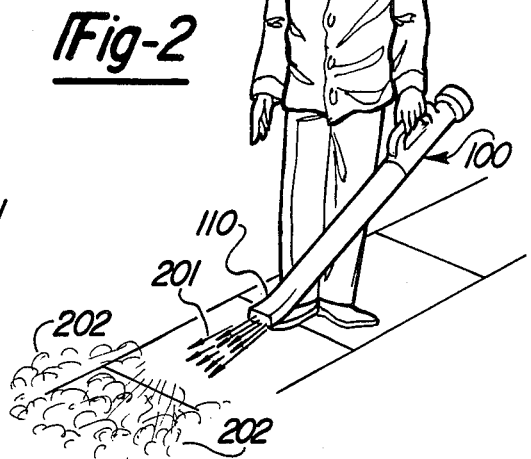
FIG. 2 is a view demonstrating the use of the blower of FIG. 1.
Figure 4:
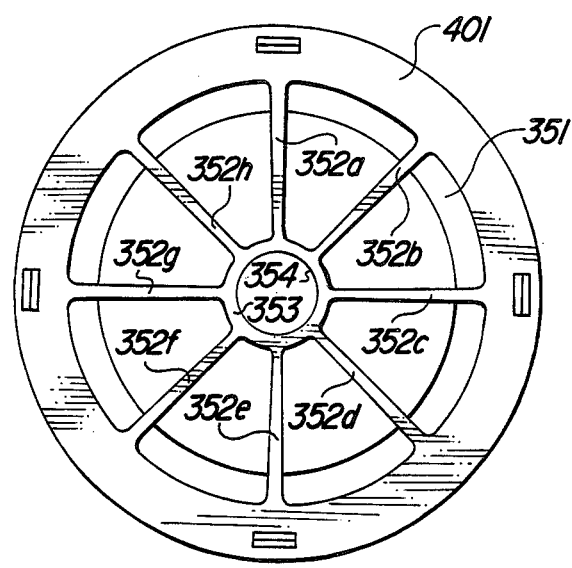
FIG. 4 is a view from the inlet end of the blower housing taken along line 4—4 of FIG. 3.

FIG. 2 depicts the manner in which the blower of FIG. 1 would be typically used for clearing debris such as grass clippings 202 from a sidewalk 201. The elongated actuator switch 112 of handle 108 enables the operator to grasp the handle at various positions to obtain a desired balance, yet enables easy on-off actuation of the blower motor without the necessity of shifting the user's hand position on the handle grip 116. Therefore, the blower is easily used by individuals of varying heights. The arrangement of the handle requires the user, as shown in FIG. 2, to point the blower at the desired work surface as a natural extension of the user's arm. Locating the batteries in the handle avoids the "pendulum effect" weight problem common with many portable devices and enables maintenance of a stable operating position of the blower outlet nozzle while the blower assembly is in use.

Further details of the structure and function of the drive motor fan and carrying handle are best given in conjunction with FIGS. 3 through 7. In the views of FIGS. 3 through 7, like components are given the same designations in the various views. Housing portion 102 is fashioned in two half pieces 102a and 102b, the respective halves fashioned, for example, by injection molding, being coupled together using screws such as at 601 (FIG. 6) engaging screw boss portions 341b and 341a. In FIG. 3, two locations for the screw bosses extending from an exterior housing wall are shown at 341a and 342a. Housing portion 102a has a decreased diameter as at 301 for receipt over an outer surface thereof of an end of the exhaust nozzle portion 104 (FIG. 1). The nozzle portion 104 is detachably coupled to housing portion 102 via lugs engaging openings 303 and 304 in the wall of housing portion 102. The openings extend horizontally for a short distance and then slant circumferentially such that the exhaust nozzle may be slipped on to portion 301 of housing 102 and then twisted so as to lock it into position. As seen best from FIG. 7, each half of housing 102—i.e., 102a and 102b— carries one of the coupling openings 303 and 304, respectively.

At the inlet end of the tubular housing portion 102 is placed a guard member 106 having a generally increased diameter over that of the midsection of the tubular housing in the area of a drive motor 305 and fan assembly 307. Guard member 106 includes a slightly flared portion 351 extending from the tubular housing portion to the inlet aperture itself. Additionally, the guard member includes a plurality of arcuate ribs 352a through 352h as seen from FIGS. 3 and 4. Ribs 352 extend from the flared surface portion 351 of the housing at an outer annular section of a guard face 401 inwardly to an annular member 353 defining a smaller substantially circular inlet area 354 located centrally of the housing tube. As seen from FIG. 4, guard end member 401 and radially extending ribs 352a–h serve to prevent a user from inserting his hand into the inlet end of the housing and contacting the blower fan.

As seen from FIG. 3, disposed substantially centrally of the housing portion 102 is a drive motor 305 having a drive shaft 309 which extends substantially coaxially with the longitudinal axis 101 of the housing tube. Drive motor 305 in the preferred embodiment comprises a DC permanent magnet motor. Coupled to the drive shaft 309 is an axially directed fan 307 having three blades 311a, b, c for directing air to the right as seen in FIG. 3 towards the outlet nozzle of the blower assembly. Abutting motor 305 at an end remote from the fan 307 is a streamlining member 320 comprised of a substantially conical extension 321 having a cone base abutting the end of the motor and a cone apex directed toward the outlet nozzle.

Radially spaced around motor 305 are four air directing vanes 322, 323, 331 and 332. Each air directing vane is curved at its end closest to fan 307, as seen in the edge view of vane 331 of FIG. 3, such that air exiting the fan blades is smoothly directed along the vane. In this manner, the airflow from the fan is directed in a direction substantially parallel to the longitudinal axis 101 of the housing with minimal radial or swirling components. Straightening vanes 322 and 323 are coupled to, or are integrally formed with, streamlining member 320, while straightening vanes 331 and 332 are coupled to, or alternatively integrally formed with, an inner wall of housing portion 102. As seen from FIG. 6, for example, vane 331 extends from housing wall portion 102a while vane 332 extends from housing wall portion 102b. Tab portions on vanes 331 and 332 engage air cooling apertures or ports in motor 305, one of which is shown at 306a in FIG. 3. (The details of the engagement of such tabs with the apertures on the motor will be discussed in a later section of this description.) Hence, motor 305 is radially supported by portions of vanes 322, 323, 331 and 332 at a preselected position within blower housing 102 concentric with the logitudinal axis 101 of the housing as noted above. Additionally, motor 305 is thereby substantially fixed against axial and rotational movement relative to the blower housing by the engagement of the ports, such as 306a, with the tab portions of the straightening vanes which are coupled to, or are integral with, the housing wall 102a or 102b.

Figure 5:
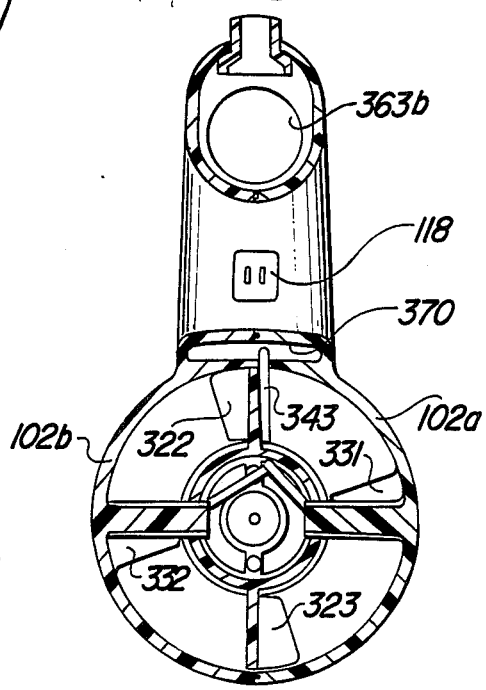
FIG. 5 is a view along the axis of the housing blower taken along line 5—5 of FIG. 3.

With continued reference to FIG. 3 and FIG. 5, housing portion 102 includes a handle portion 108 extending from an outer portion of housing wall 102 and defining a handle grip portion 116 separated from housing portion 102a via an opening 120. Within the gripping portion 116 of handle 108 is a storage compartment for a plurality of rechargeable DC energy cells or batteries, six of which are shown in the view of FIG. 3 and designated 363a through 363f. Extending above an upper surface of the handle grip portion is an elongated switch actuator 112 having an end portion 361 within handle member 108 which is coupled to a movable element 362 of electrical switch 364. Switch 364 is operable in a conventional manner to place the plurality of batteries 363a-f in circuit with motor 305 for actuation thereof. The plurality of batteries is placed between two terminals 391 and 392 which are appropriately connected to the electrical circuitry of the blower in a conventional manner. Drive motor 305 is electrically connected to the battery array and switch 364 via lead wires 343 and 343a and 343b which are contained within a cavity 370 formed between an outer wall of the housing tube 102 and the handle element 108.

Additionally in handle member 108 is a female jack element 118 for providing access from the battery array to a source of electrical charging energy. Preferably, the jack 118 is located in a protected location on an interior surface of the handle 108 as shown.

To enhance the airflow characteristics of the blower, the inlet nozzle and guard at 106 are designed so as to minimize the pressure drop normally associated with the acceleration of air being drawn into the blower housing by fan 307 around the inlet guard. Air drawn into a substantially cylindrical duct such as provided by housing portion 102 tends to swirl at the inlet resulting in a reduced effective inlet area and an increased pressure drop across the inlet aperture. To avoid such losses, a radiused flange such as at 351 is placed between the inlet opening and the conduit formed by the housing wall 102. Additionally, as the inlet guard will necessarily occupy or block some of the opened inlet port area, it is desirable to locate the guard at the enlarged inlet portion of the housing tube. In this manner, the net open area at the guard (between the ribs 352 and the walls of the annular member 353) can be made at least as large as the cross-sectional area of the blower housing duct at the fan to minimize the losses associated with the disruption of the air around the guard as it enters the blower housing. Alternatively, the motor and fan assembly may be located a greater distance away from the inlet to the housing (subject to the noise reduction considerations discussed below) and the guard assembly reduced to a single diametric rib or eliminated altogether. Such a construction would reduce the degree to which the inlet would need to be enlarged in order to insure a smooth flow of air into the tubular housing.

With reference to FIGS. 7 through 10, the outlet or exhaust nozzle portion 104 of the blower assembly of FIG. 1 will be described in more detail. Exhaust nozzle 104 has an outlet port 114 which in the preferred embodiment is substantially rectangular in cross-section. Other outlet port configurations, however, may be used. Exhaust nozzle 104 is detachably coupled to housing portion 102 by sliding the end portion containing lugs 901 and 902 over the decreased diameter housing portion 301 of housing portion 102 such that lugs 901 and 902 will resepectively enter curved slots 303 and 304 formed in section 301 of housing portion 102. After insertion of the lugs into the slots, the exhaust nozzle 104 is then rotated to lock the connection in place. The portion of nozzle 104 terminating in an outlet opening 114 is preferably angled at 110 with respect to the remainder of the outlet nozzle such that the air being expelled by the blower fan out of the blower assembly will exit substantially parallel to the surface to be cleared of debris. In this orientation, undersurface 801 of the exhaust nozzle faces the work surface and may be provided with a brush 1002 detachably coupled to the exhaust nozzle via a spring clip 1001.

The brush-spring clip assembly 1000 as set forth in the perspective view of FIG. 10 is seen to comprise the brush bristles 1002 retained in a U-shaped portion of the spring clip 1001, the U-shaped channel being designated 1003. The spring clip has an upper surface 1004 which defines an opening 1005 between the brush-holding channel 1003 and the upper portion of the clip 1004. As seen from FIG. 8, the clip is forced over an end lip of the outlet port 114 along bottom surface 801 of exhaust tube 104 to clamp the brush in operative position.

While the size of the housing tube portion containing the fan is dictated by the fan diameter, the size of the outlet port 114 at the end of the output nozzle 104 can be chosen from a wide variety of sizes. A large diameter outlet will cause little resistance to airflow and therefore produce a high airflow volume rate. However, because the area would be large, the air velocity would be low. Likewise, a smaller diameter outlet will result in a lower air volume rate but an increased velocity. Hence, the nozzle outlet area is optimally varied until a satisfactory blend of volumetric air flow and air velocity is attained.

The angle that the exahust tube housing portion 104 makes with its terminal end at 110 in the preferred embodiment is determined by the overall blower tube length, handle location, operator height and the desirability for air discharge parallel to the work surface. It is contemplated that the present portable blower will normally be used by moving the outlet nozzle back and forth near a horizontal work surface such as the ground. Occasionally, the outlet nozzle may also be used to dislodge stubborn debris (either directly or through the use of the optional brush assembly attachment 1000 shown in FIGS. 8 and 10). In order to prevent the outlet nozzle from wearing through and to improve scraping performance, the bottom of the outlet nozzle at 801 has been flattened and widened while maintaining the required outlet area. This results in the substantially rectangular outlet opening shown at 114. The flattened botton 801 also enables a more facile attachment of the brush assembly 1000 principally for dislodging small debris from rough surfaces (for example, for removal of sand from a driveway).

Figure 11:
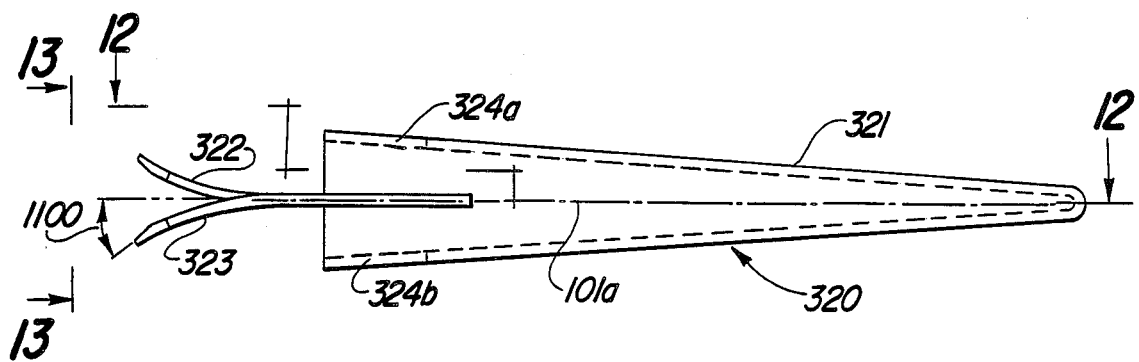
FIG. 11 is a side view of the blower motor support for the blower assembly set forth in FIG. 3.
Figure 12:
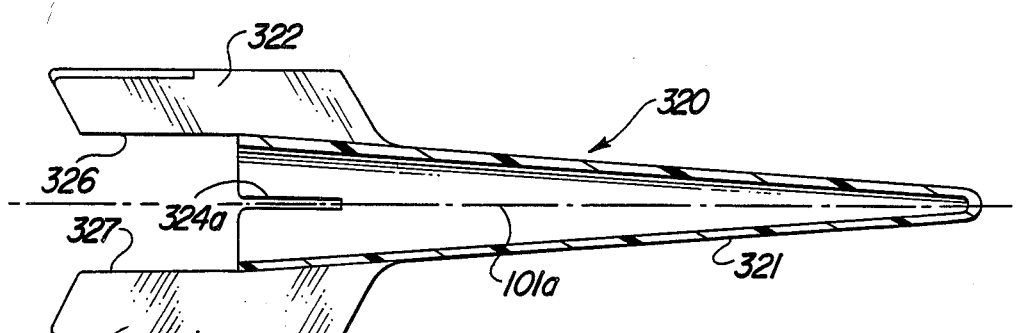
FIG. 12 is a cross-sectional view of the blower motor support taken along line 12—12 of FIG. 11.
Figure 13:
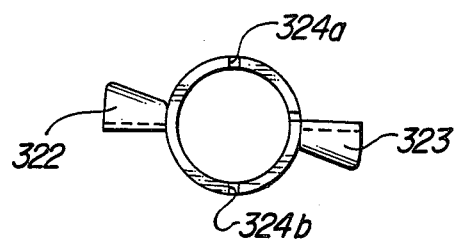
FIG. 13 is an end view of the blower motor support taken along line 13—13 of FIG. 11.

Referring to FIGS. 11–15, the combined motor support and airflow smoothing and guiding apparatus will now be explained. With particular reference to FIGS. 11 through 13, the streamlining element 320 has a conical surface 321 extending from a base which abuts an end of motor 305 (FIG. 3) and extends at a preselected taper angle to a cone apex facing the exhaust nozzle portion of the blower assembly. Coupled to or integrally formed with the streamlining cone portion 321 are a pair of substantially axially extending air straightening and guiding vanes 322 and 323 extending diametrically opposite from one another from the surface of the cone element. As seen from FIG. 11, an end portion of each vane furthest from the conical element makes an angle designated 1100 with the longitudinal axis 101a of the conical portion 320 (which is substantially coaxial to the longitudinal axis 101 of the blower housing tube of FIG. 3). These end portions are angled such that air exiting the fan will be efficiently redirected in a direction substantially parallel to the axis of the blower housing tube. Two slots 324a and 324b are formed diametrically opposite one another in the surface of the conical portion 321 and are positioned so as to receive a portion of two other air guide vanes which extend from the housing wall.

The two guide vanes extending from the housing wall are best described with reference to FIGS. 14a and 14b. FIG. 14a sets forth a side view of air guide vane 331 which is shown principally in phantom in the view of FIG. 3. The portion of vane 331 closest to the fan is, like the vanes 322 and 323 of FIG. 11, angled with respect to the air exiting the fan so as to enable efficient smoothing and redirecting of the exiting air stream. It is to be understood that the second guide vane extending from the other half of the housing portion 102, designated in FIG. 14b as 332 when viewed in side section will have a portion nearest the fan which extends at an angle opposite to that shown for vane 331 in FIG. 14a. Hence, vanes 331 and 332 serve a similar purpose to vanes 322 and 323 of FIG. 11, except that vanes 331 and 332 are positioned in different quadrants of the cross-section of the tubular housing with respect to the outlet of the fan.

With particular reference to FIG. 15, the manner in which the vanes straighten the airflow from the fan will now be explained. As seen from FIG. 15, the air entering the fan has a vector component V1 parallel to the longitudinal axis 101 of the blower housing. TThe fan blade has a tangential velocity component U1. The relative velocity of the air with respect to the blade is represented by the vector W1. The air exiting from the blade 1501 has a non-axially directed major component vector V2 along with tangential components U2 and relative velocity component W2. The straightening vane 1502 provides an end portion 1504 which lies substantially parallel to the direction of airflow 1503 as it exits fan blade 1501 (i.e., parallel to vector V$_2$). The air leaving the fan has a rotational velocity component as shown by the difference in the absolute velocity vectors V1 into the fan and V2 out of the fan. The difference between V2 and V1 is related to the amount of energy put into turning the fan and the mass flow rate of air flowing through the fan. Without straightening vanes shaped such as vane 1502, the air would spin down the lower housing tube wasting the kinetic energy added by the fan ($\frac{1}{2}m(V_2^2 - V_1^2)$). With a straightening vane such as 1502, the air is redirected to flow axially down the tube at velocity V1. Because the airflow velocities before and beyond the fan are substantially equal, and further because the tangential component of the airflow has been removed, the fan thereby adds pressure to the airflow. In effect, the tangential air component has been converted to increased pressure. This added static pressure thus results in higher exit velocity out of the tube outlet 114 than would be possible without the straightening vanes.

As seen from FIG. 14b, vanes 331 and 332 serve the additional purpose of positioning the motor 305 and fixing it against axial and rotational movement relative to the housing. In particular, vanes 331 and 332 are provided with respective tab sections 1403 and 1405 which engage cooling ports or apertures 306b and 306a, respectively, in an outer surface of motor 305. Additionally, vanes 331 and 332 bear against a second solid portion of the housing of motor 305 for further stability in supporting the motor-fan assembly. As an optional arrangement for the vane supporting structure set forth in FIG. 14b, each tab portion may have a hole (1401 for tab 1403, or 1402 for tab 1405) formed in the tab portion for receipt of a support member such as a steel pin to provide added resistance to fracture or shearing of the tab members extending from the guide vanes.

The tail cone or streamlining element 320 shown in FIGS. 3, 11 and 12 allows the air to gently expand from an annular airflow passage about motor 305 downstream of the fan without excessive separation to a more fully circular air passage towards the outlet nozzle, thereby reducing the drag on the motor. Hence, the loss of pressure as the air leaves the motor is minimized, resulting in higher airflow for a given amount of energy put into the fan by the drive motor. The preferred slope of the conical surface 321 from the motor towards the outlet end is on the order of 7 degrees.

The four air straightening vanes 322, 323, 331 and 332, with two vanes depending from the housing and two from the streamlining cone, support drive motor 305 at a preselected position within the housing. As previously noted, the motor 305 is oriented so that the axis of the motor is aligned with the longitudinal axis 101 of the housing 102, thereby enhancing airflow past the motor. In addition, it should also be noted that the blower housing itself is more easily fashioned, for example by injection molding, with the arrangement wherein two of the vanes are coupled to the streamlining cone, while one vane is integral with or coupled to each half of the housing body 102a or 102b.

The present invention additionally contemplates arrangements for abating noise and vibration of the blower while the fan is operating. With reference to FIG. 3, as each fan blade 311a, b, c passes one of the four vanes 322, 323, 331, or 332, it is unloaded and reloaded thereby causing a pulsation in the thrust of the fan. If all the blades do this simultaneously, the vibration and sound at a frequency of four times the rotational speed of the fan could be excessive. To avoid this problem, the number of fan blades should be unequal to the number of air directing stationary vanes. Hence, for the embodiment set forth in FIG. 3, there are three fan blades and four stationary air guide vanes. Because the blower of the invention is particularly suited to applications requiring lower static pressure, it is also preferable that the solidity of the fan (i.e., the percentage of the area of the housing duct occupied by the projected area of the fan blades) be low. Hence, for a given solidity and desired blade angle, a three-bladed fan as set forth at 307 of FIG. 3 is used in the embodiment disclosed.

Another consideration for noise abatement in practicing the invention relates to the positioning of the fan relative to the inlet port of the tubular blower housing. Sound generated by fans usually has predominant frequencies (with corresponding predominant wave lengths), one of which is equal to the rotational speed of the fan multiplied by the number of fan blades. This predominant frequency is called the "blade-pass-frequency." When sound waves are generated in open ended tubes such as the blower housing of the embodiment of FIG. 1, waves of certain frequencies resonate in the tube. Such waves are referred to as standing waves and have nodes at the end of the tube. However, standing waves, like those of an organ pipe, can only exist if the wave length of the sound is such that a pressure node (low pressure) is present at the end of the blower housing duct. Under such a condition, the wave will be reflected back into the duct by the higher pressure just beyond the end of and outside of the duct. The duct will thus resonate at the standing wave frequency.

Accordingly, by positioning the source of the noise, in this case the fan, at a distance from the end of the tube equal to one-quarter of the wave length of the predominant frequency, the intensity of the noise at that frequency can be greatly reduced. Of course, it will be recognized by those skilled in the art that the one-quarter wave length spacing consideration theoretically applies only to the ideal case. The noise generated by the fan in a practical device such as that set forth with reference to FIGS. 1 through 14b, has predominant frequencies that depend on the number of fan blades, the number of air guide vanes, and the rotational speed of the fan. By carefully adjusting the distance between the inlet port at guard 106 and the fan, the predominant frequencies can be abated by preventing standing waves of the wave lengths corresponding to those predominant frequencies.

Since, as described above, the duct is not perfectly cylindrical from one end to the other, the preferred location of the fan can be determined most readily using a spectrometer to define the location of standing wave nodes for various frequencies generated by the fan. In any event, the invention contemplates locating the fan at a distance from the inlet port at guard 106 that will inhibit the generation of standing waves of predominant frequencies, thereby rendering the operation of the blower of the invention relatively quiet and vibrationless.

Several alternative arrangements contemplated by the invention will now be briefly described with reference to FIGS. 16 through 21.

FIG. 16 depicts a first alternative embodiment in a cross-sectional view similar to FIG. 3. In this alternative arrangement, rather than providing a separate handle grip extending from outside the air duct formed by the housing wall, blower 100a is held by gripping the main body housing 102. The batteries 363-1 through 363-6 are stored in the main body housing within the conical element 320 used for streamlining purposes adjacent to motor 305. The battery array is therefore located coaxially with the longitudinal axis 101 of the blower housing. The air straightening vane and support system for the motor 305 is otherwise substantially identical to that described with reference to the preferred embodiment of FIG. 1, except that it also serves to support and align the battery array.

FIG. 17 depicts, in perspective form, a second alternative embodiment wherein a shoulder strap 1705 is provided for carrying the blower 100b. Alternatively, the blower 100b could be grasped at section 1701 which houses the fan motor and support vane arrangement similar to that described with reference to the preferred embodiment. Exhaust tube 1702 would be similar to that previously described. Inlet 1704 would be provided with a guard arrangement (not specifically shown) which is similar to that described with reference to the preferred embodiment. In the embodiment of FIG. 17 however, the batteries would be housed in an integral compartment 1703 of the housing such that the batteries would lie outside of the main air stream being drawn into the blower housing by the fan and motor.

A third alternative embodiment is set forth in the partial side plan view of FIG. 18. Housing 100c utilizes a separate rechargeable battery pack 1801 having terminals at 1805 for engaging a spring loaded terminal 1804 within a specially provided compartment 1802 in the housing of blower 100c. A hinged access door 1803 swings up to permit insertion of battery pack 1801 into the compartment 1802 for engagement with spring loaded terminal 1804. As shown by the dotted lines in FIG. 18, the battery pack is cabled to the motor and to an elongate switch 112 provided in handle 108 for proper feed of energy to the drive motor 305 whenever the actuating switch 112 is set up to a predetermined ON position. When the battery pack 1801 needs recharging, it can be removed from housing compartment 1802 and attached to a suitable source of recharging energy.

Figure 19:
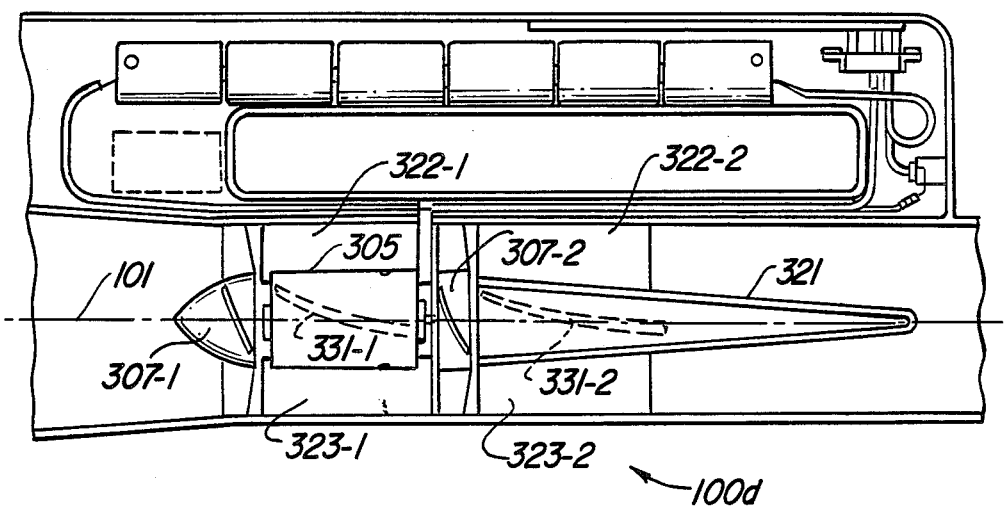
FIG. 19 is a side cross-sectional view of a fourth alternative embodiment utilizing two tandem blower fans in a blower assembly designed in accordance with the principles of the invention.

FIG. 19 depicts a side cross-sectional view of part of a fourth alternative embodiment of a portable blower designed in accordance with the principles of the invention wherein a tandem arrangement of more than one, for example two, blower fans is utilized for providing increased air output. As seen from FIG. 19, blower fans 307-1 and 307-2 are mounted to opposite ends of a drive shaft driven by motor 305. Downstream of the second fan 307-2 is a conical streamlining device 321. Also used with the blower housing 100d of this embodiment are air straightening vanes 322-1, 323-1 and 331-1 surrounding motor 305 and vanes 322-2, 323-2, and 331-2 surrounding streamlining cone 321 immediately downstream of the second fan 307-2. It will be apparent of course that a fourth vane for each fan corresponding respectively to vanes 331-1 and 331-2 extends along the exiting air path for each fan but is not shown in the view of FIG. 19.

The invention additionally contemplates providing apparatus for enabling adjustment of the blower airflow rate. Two such arrangements are shown in the alternative embodiments of FIGS. 20 and 21.

Figure 20:
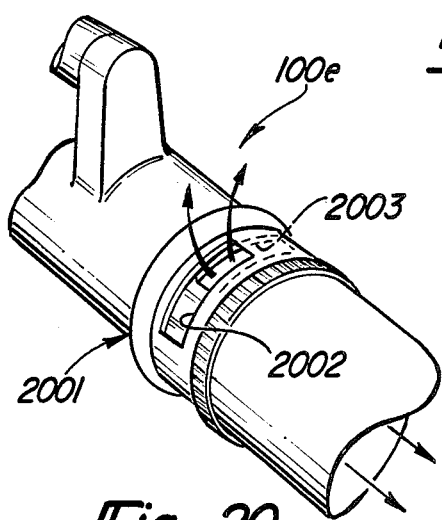
FIG. 20 is a perspective view of a fifth alternative embodiment employing an adjustable collar apparatus for varying the airflow rate of a blower assembly designed in accordance with the principles of the invention.

In a fifth alternative embodiment set forth in the partial perspective view of FIG. 20, variable airflow adjustment is made possible by providing an aperture 2003 in the tubular housing wall of blower 100e. Mounted for rotation about the tubular housing directly over the aperture 2003 is a rotatable collar 2001 having an apertured portion 2002 while the remainder of the collar is solid. Hence, by suitably rotating collar 2001 it will be seen that all or a portion of aperture 2003 in housing wall 100e will be exposed via the apertured portion 2002 of the collar, thereby enabling a preselected amount of airflow to be diverted out of the side of the housing to thereby alter the airflow which will ultimately exit the exhaust port.

Figure 21:
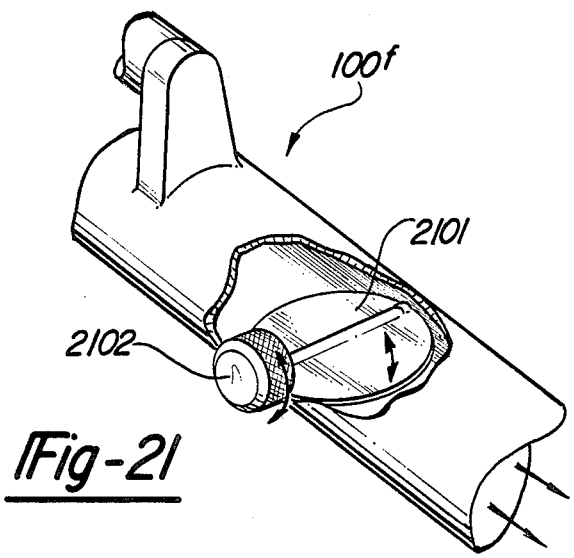
FIG. 21 is partially cut-away perspective view of a sixth alternative embodiment employing an adjustable butterfly valve apparatus for varying the airflow rate of a blower assembly designed in accordance with the principles of the invention.

A second approach to providing adjustable airflow rates is set forth in a sixth alternative embodiment in the partial perspective view of FIG. 21 wherein a butterfly valve 2101 is pivotally mounted within the air conduit defined by the housing body of a blower 100f. Coupled to the butterfly valve 2101 is an adjustment knob 2102 which is mounted exteriorly of the blower housing for manual adjustment of the position of the butterfly valve 2101 with respect to the airflow being directed outwardly toward the exhaust port. Hence, in a manner similar to that seen in venturi chambers, such as found in carburetors, the butterfly valve 2101 will alter the airflow rate in accordance with its relative position within the blower housing tube.

It will be apparent to those of ordinary skill in the art, given the disclosure of this detailed description, that there will be yet further alternative arrangements still falling within the contemplation of the invention. For example, variations in the airflow rate could be provided by utilizing a variable speed electric motor for driving the fan and the blower. Also, it will be seen that a variety of accessories could be provided with a blower unit designed in accordance with the principles of the invention, such accessories including various nozzles having different types of scrapers, brushes or other apparatus for dislodging objects that are heavy or stuck to the work surface to be cleaned by the blower. In a still further alternative arrangement, it may be desired to provide for the ability to step up the performance of the blower by enabling the facile addition of more battery cells to the housing. In yet another alternative arrangement, it may be desirable to provide means for converting the blower unit to a vacuum cleaning device wherein a filter bag or other collection device would be placed on the suction side of the blower fan. In such an arrangement two switches could be used to allow the product to be used in either a blowing or vacuuming mode of operation.

The invention has been described with reference to a preferred embodiment and several alternative arrangements. Such detailed description has been given for the sake of example only. The scope and spirit of the invention are to be governed by the appended claims.

What is claimed is:

1. Portable blower apparatus comprising:
   an elongate tubular housing having an inlet end and an outlet end;
   a drive motor having a drive shaft extending substantially coaxially with the longitudinal axis of the housing;
   fan means coupled to the drive shaft for rotation about said longitudinal axis for moving air from the housing inlet end to the housing outlet end; and
   airflow directing and smoothing means positioned with respect to the drive motor and fan means to smooth the airflow passing over the drive motor and to maintain the airflow substantially parallel to said longitudinal axis;
   the fans means being positioned relative to the housing inlet such that standing waves within the housing having predominant noise frequencies generated by the fan means are inhibited.

2. The apparatus of claim 1 further comprising means at the inlet end for avoiding swirling of air which is being drawn into inlet end by the fan means.

3. The apparatus of claim 2 further comprising guard means at the inlet end for preventing the hand of a user from contacting the fan means from the inlet end of the housing.

4. The apparatus of claim 3 wherein the cross-sectional area of the inlet end is enlarged such that the inlet end has an open area at the guard means at least as large as the cross-sectional area of the housing at the location of the fan means.

5. The apparatus of claim 1 further comprising an output nozzle at the outlet end of the housing.

6. The apparatus of claim 5 wherein the output nozzle is angled with respect to the housing such that when the blower apparatus is held in a normal operating position, air is discharged from the output nozzle substantially parallel to a surface being cleaned by the blower.

7. The apparatus of claim 6 wherein a housing portion comprising the output nozzle is removably coupled to a housing portion containing the drive motor and fan means.

8. The apparatus of claim 1 further comprising handle means extending outwardly of the housing and having a handle grip extending substantially parallel to the longitudinal axis of the housing.

9. The apparatus of claim 8 wherein the drive motor is powered by at least one DC energy cell and wherein the at least one energy cell is housed within a portion of the handle grip.

10. The apparatus of claim 9 wherein the at least one DC energy cell is rechargeable and wherein the apparatus further comprises means for coupling the at least one rechargeable cell to a source of charging energy.

11. The apparatus of claim 1 wherein the airflow directing and smoothing means includes a substantially conical streamlining member having a cone base abutting an end of the drive motor remote from the fan means and a cone apex facing toward the outlet end of the housing.

12. The apparatus of claim 11 wherein the drive motor is powered by at least one DC energy cell and wherein the at least one energy cell is housed within a portion of the streamlining member.

13. The apparatus of claim 12 wherein the at least one DC energy cell is rechargeable and wherein the apparatus further comprises means for coupling the at least one rechargeable cell to a source of charging energy.

14. The apparatus of claim 11 wherein said fan means has a plurality of fan blades configured for moving air from the housing inlet end to the housing outlet end and further wherein the airflow directing and smoothing means further includes at least one stationary air straightening vane coupled to an inner wall of the housing and at least one stationary air straightening vane coupled to the streamlining means, all the vanes surrounding the drive motor and having ends adjacent the fan means to thereby support the drive motor in a predetermined position within the housing, and each vane including a first portion substantially parallel to airflow emanating from the fan means and a second portion coupled to the first portion and extending substantially parallel to the longitudinal axis of the housing, each vane operative to smoothly alter the direction of airflow emanating from the fan means at an angle to the longitudinal axis determined by blade characteristics of the fan means to a direction substantially parallel to the longitudinal axis.

15. The apparatus of claim 14 wherein the drive motor includes at least one cooling port opening at an exterior surface of the drive motor and wherein the at least one vane coupled to an inner wall of the housing further includes a tab portion positioned to engage the at least one port thereby substantially fixing the drive motor against movement relative to the housing.

16. The apparatus of claim 15 wherein the tab portion includes a cavity for receipt of a support pin for reducing the possibility of fracture of the tab when subjected to forces generated by the drive motor.

17. The apparatus of claim 1 wherein the drive motor is powered by at least one DC energy cell and wherein the housing further comprises an integral compartment for housing the at least one energy cell such that it does not lie in the path of airflow moved axially through the housing by the fan means.

18. The apparatus of claim 17 wherein the at least one DC energy cell is rechargeable and wherein the apparatus further comprises means for coupling the at least one rechargeable cell to a source of charging energy.

19. The apparatus of claim 1 wherein the drive motor is powered by at least one DC energy cell and wherein the apparatus further comprises a separate compartment containing the at least one cell, the compartment electrically, yet detachably coupled to the housing for powering the drive motor.

20. The apparatus of claim 19 wherein the at least one DC energy cell is rechargeable and wherein the separate compartment includes means for coupling the at least one rechargeable cell to a source of charging energy.

21. The apparatus of claim 1 wherein said fan means has a plurality of fan blades configured for moving air from the housing inlet end to the housing outlet end and further wherein the airflow directing and smoothing means includes at least one stationary air straightening vane adjacent the fan means, each vane including a first portion substantially parallel to airflow emanating from the fan means and a second portion coupled to the first portion and extending substantially parallel to the longitudinal axis of the housing, each vane operative to smoothly alter the direction of airflow emanating from the fan means at an angle to the longitudinal axis determined by blade characteristics of the fan means to a direction substantially parallel to the longitudinal axis.

22. The apparatus of claim 1 wherein the fan means comprises first and second blower fans coupled to opposite ends of the drive shaft at opposing ends of the drive motor.

23. The apparatus of claim 1 further comprising means for adjusting airflow rate through the housing.

24. The apparatus of claim 23 wherein the means for adjusting comprises an aperture in a housing wall and a collar rotatably mounted to the housing and overlying the aperture, the collar including an apertured portion and a solid portion arranged such that, upon rotation of the collar, variable portions of the housing aperture may be aligned with the apertured portion of the collar.

25. The apparatus of claim 23 wherein the means for adjusting comprises a butterfly valve pivotally mounted within the housing and coupled to a control knob accessible from outside the housing for varying the position of the butterfly valve with respect ot the axially directed airflow.

26. A hand-held, cordless, electrically driven blower comprising:
- an elongate tubular housing defining a longitudinal axis and having an inlet end aligned with said longitudinal axis and an outlet end;
- an electrical drive motor having a drive shaft extending substantially coaxially with the longitudinal axis of the housing;
- fan means coupled to the drive shaft for rotation about said longitudinal axis and having a plurality of fan blades arranged for moving air from the housing inlet end to the housing outlet end;
- a plurality of airflow directing vanes surrounding the drive motor for maintaining airflow substantially parallel to the longitudinal axis;
- substantially conical streamlining means for smoothing airflow exiting the fan means and passing over the drive motor and having a cone base abutting an end of the drive motor remote from the fan means and a cone apex facing toward the outlet end of the housing;
- at least one rechargeable DC energy cell coupled to the drive motor for furnishing electrical energy thereto; and
- receptacle means for coupling the at least one cell to a source of charging energy.

27. The blower of claim 26 wherein the fan means is positioned a predetermined distance from the housing inlet end so as to inhibit formation of standing waves within the housing having predominant noise frequencies generated by the fan means.

28. The blower of claim 27 wherein the plurality of fan blades is unequal to the plurality of airflow directing vanes.

29. The blower of claim 28 wherein the plurality of airflow directing vanes comprises first and second sets of vanes, the first set of vanes coupled to an interior surface of the housing and the second set of vanes coupled to the streamlining means.

30. The blower of claim 29 wherein the driven motor includes at least one aperture and wherein at least one of the first set of vanes includes a tab portion positioned to engage the at least one aperture thereby substantially fixing the drive motor against movement relative to the housing.

31. The blower of claim 26 further comprising guard means coupled to the inlet end of the housing for preventing the hand of a user from contacting the fan means from the inlet end, the guard means including a plurality of ribs radially extending from an enlarged flared portion at the inlet end to an annular element centered about the longitudinal axis, the guard means presenting an open area at the inlet end at least as large as the cross-sectional area of the housing at the location of the fan means.

32. The blower of claim 26 wherein the housing further comprises an exhaust portion terminating in a substantially rectangular outlet nozzle opening at the outlet end of the housing, the exhaust portion being angled with respect to the longitudinal axis such that, when the blower is held in a normal downward pointing operating position, the outlet nozzle is positioned so as to discharge air substantially parallel to a surface being cleaned by the blower.

33. The blower of claim 32 wherein the exhaust portion is removably coupled to a remainder of the housing.

34. The blower of claim 32 further comprising a brush detachably mounted to one side of the exhaust portion adjacent the outlet nozzle.

35. The blower of claim 26 further comprising a handle coupled to the housing and having a handle grip extending substantially parallel to the longitudinal axis of the housing, the handle grip including a storage compartment for the at least one energy cell and an elongate actuating switch means operative to place the at least one energy cell in circuit with the drive motor.

36. The blower of claim 35 wherein said receptacle means is located in said handle.

37. The blower of claim 36 wherein said receptacle means is located in a relatively protected interior surface of said handle.

38. The blower of claim 26 wherein the housing includes a storage compartment for the at least one energy cell oriented such that the energy cell is stored out of the path of the air stream.

39. The blower of claim 26 wherein the at least one energy cell is housed within the streamlining means.

40. The blower of claim 26 further comprising a separate energy cell package detachably coupled to the housing and including the receptacle means.

41. The blower of claim 26 further including means for adjusting airflow rate through the housing comprising an aperture in a housing wall located between the fan means and the outlenl end, and a collar rotatably mounted to the housing and overlying the aperture, the collar including an apertured portion and a solid portion arranged such that, upon rotation of the collar, variable portions of the housing aperture may be aligned with the apertured portion of the collar.

42. The blower of claim 26 further including means for adjusting airflow rates through the housing comprising a butterfly valve pivotally mounted within the housing and coupled to a control knob accessible from outside the housing for varying the position of the butterfly valve with respect to the axially directed airflow.

43. A hand-held, cordless, electrically driven blower comprising:
   an elongate tubular housing having an inlet end and an outlet end;
   guard means coupled to the inlet end for preventing access to the interior of the housing from the inlet end, the inlet end having an enlarged flared portion containing the guard means such that an open area at the inlet end is at least as large as the cross-sectional area of the housing remote from the inlet end;
   an electrical drive motor having a drive shaft extending substantially parallel to a longitudinal axis of the housing and including first and second apertures on opposite sides of an outside surface of the drive motor, each facing an interior wall of the tubular housing;
   a fan having three blades arranged for moving air from the housing inlet to the housing outlet end, the fan coupled to the drive shaft for rotation about the longitudinal axis;
   a substantially conical streamlining member for smoothing airflow exiting the fan and passing over the drive motor and having a cone base abutting an end of the motor remote from the fan and a cone apex facing toward the outlet end of the housing;
   first and second airflow detecting vanes coupled to and extending from the interior wall of the housing on opposite sides of the drive motor in the vicinity of the first and second apertures in the motor, the first and second vanes including a tab portion for respectively engaging the first and second apertures in the motor;
   third and fourth airflow directing vanes coupled to and extending from the streamlining member and positioned substantially 90 degrees rotationally offset from the first and second vanes, the first, second, third and fourth vanes at least partially surrounding the drive motor for providing the dual functions of supporting the drive motor in a preselected position within the blower housing and for maintaining airflow exiting the fan substantially parallel to the longitudinal axis of the housing;
   an exhaust portion of the housing coupled to a portion of the housing containing the drive otor and fan, the exhaust portion being angled with respect to the longitudinal axis such that, when the blower is held in a normal downwardly pointing operating position, the outlet nozzle is positioned so as to discharge air substantially parallel to a surface being cleaned by the blower;
   a plurality of rechargeable batteries retained in the housing and coupled to the drive motor for furnishing electrical energy thereto; and
   means on the housing for coupling the plurality of batteries to a source of charging energy.

44. The blower of claim 43 further comprising a handle coupled to the housing and having a handle grip extending substantially parallel to the longitudinal axis of the housing, the grip including a storage compartment for the plurality of rechargeable batteries and an elongate actuating switch operative to place the plurality of batteries in circuit with the drive motor, the handle further housing the means for coupling the plurality of batteries to the charging energy source.

45. The blower of claim 43 wherein the plurality of batteries is housed within the streamlining member.

46. The blower of claim 43 further comprising a separate rechargeable battery pack and wherein the housing further includes a compartment accessible from outside the housing for removable receipt of the battery pack, the compartment including terminal means for coupling electrical receipt of the battery pack when it is placed within the compartment.

47. The blower of claim 43 further including an aperture in the housing wall and a collar rotatably mounted to the housing over the housing wall aperture, the collar having an apertured portion and a solid portion arranged such that, upon rotation of the collar, variable portions of the housing aperture can be aligned with the apertured portion of the collar.

48. The blower of claim 43 further including a butterfly valve pivotally mounted within the housing and coupled to a control knob accessible from outside the housing for varying the position of the butterfly valve with respect to the axially directed airflow.

49. The blower of claim 43 further comprising a brush detachably mounted to one side of the exhaust portion adjacent the outlet nozzle.

50. A portable, electrically driven blower comprising:
   an elongate tubular housing having an inlet end and an outlet end, the inlet end having an enlarged flared portion incorporating guard means for preventing manual access into the inlet end, the guard means presenting a total open area at the inlet end at least as large as the cross-sectional area of the tubular housing;
   an electrical drive motor mounted within the tubular housing and having a drive shaft substantially aligned with the longitudinal axis of the tubular housing; and
   fan means coupled to the drive shaft of the motor for rotation about said longitudinal axis and having a plurality of fan blades arranged for moving air from the housing inlet end to the housing outlet end.

51. The blower of claim 50 further including a plurality of airflow directing vanes disposed within the tubular housing on the outlet side of the fan means for directing airflow from the fan means substantially parallel to the longitudinal axis of the tubular housing.

52. The blower of claim 50 further including a DC energy cell electrically coupled to the drive motor for furnishing electrical energy thereto.

53. The blower of claim 50 wherein the fan means is positioned a predetermined distance from the housing inlet end such that standing waves within the housing having predominant noise frequencies generated by the fan means are inhibited.

54. The blower of claim 50 wherein the electric drive motor is provided with cooling slots formed in an outside surface of the motor and the airflow directing vanes are additionally adapted to support the motor within the tubular housing via means engaging the cooling slots in the motor.

55. A portable electrically driven blower comprising:
an elongate tubular housing having an inlet end and an outlet end;
an electrical drive motor mounted within the tubular housing and having cooling slots formed in its outer surface and a drive shaft substantially aligned with the longitudinal axis of the tubular housing;
fan means coupled to the drive shaft of the motor for rotation about said longitudinal axis and having a plurality of fan blades arranged for moving air from the housing inlet to the housing outlet; and
support means radially located within the tubular housing for supporting the motor within the housing and being configured to direct airflow from the fan means substantially parallel to said longitudinal axis, the support means including means for engaging the cooling slots in the motor.

56. The blower of claim 55 further including a DC energy cell electrically coupled to the drive motor for furnishing electrical energy thereto.

57. The blower of claim 55 wherein said electrical drive motor comprises a DC permanent magnet motor.

58. A hand-held portable, electrically driven blower adapted for blowing debris from sidewalks, driveways, decks, and other such surfaces, comprising:
an elongated tubular housing defining a longitudinal axis and having sufficient length to extend proximate to the surface on which a user is standing when holding the blower;
an inlet portion aligned with said longitudinal axis and connected to one end of said tubular housing and an outlet portion connected to the other end of said tubular housing;
an electrical drive motor mounted entirely within the tubular housing and having a drive shaft substantially aligned with the longitudinal axis of the tubular housing;
fan means coupled to the drive shaft of the motor for rotation about said longitudinal axis and having a plurality of fan blades for moving air from said inlet portion to said outlet portion; and
a handle connected to the tubular housing and adapted to be grasped by the hand of the user so that in the normal operating position of the blower the tubular housing of the blower is suspended from the handle when in use.

59. The blower of claim 58 further including a DC energy cell electrically coupled to the drive motor for furnishing electrical energy thereto.

60. The blower of claim 59 wherein the DC energy cell is located within the handle.

61. The blower of claim 60 further including switch means located on the handle for controlling the application of electrical energy from the DC energy cell to the drive motor.

62. The blower of claim 61 wherein the switch means includes an elongated actuator that extends along a substantial portion of the elongated handle.

63. The blower of claim 58 wherein the handle is connected to the tubular housing proximate to the location of the motor.

64. The blower of claim 58 wherein the inlet portion has a diametrically enlarged flared end portion.

65. The blower of claim 64 further including guard means located at the flared end portion for preventing manual access into the housing through the inlet portion.

66. The blower of claim 65 wherein the guard means presents a total open area at the flared end portion that is at least as great as the cross-sectional area of the tubular housing.

67. The blower of claim 58 wherein the elongated tubular housing extends a relatively short distance from the handle to the inlet portion and a substantially greater distance from the handle to the outlet portion.

68. The portable blower of claim 58 wherein said handle extends substantially parallel to the longitudinal axis of the housing.

69. The portable blower of claim 58 wherein said elongated tubular housing has a substantially uniform diameter along substantially its entire length.

70. A hand-held portable, electrically driven blower adapted for blowing debris from sidewalks, driveways, decks, and other such surfaces, comprising:
an elongated tubular housing defining a longitudinal axis and having sufficient length to extend proximate to the surface on which a user is standing when holding the blower;
an inlet portion connected to one end of said tubular housing and an outlet portion connected to the other end of said tubular housing;
an electrical drive motor mounted within the tubular housing intermediate said inlet and outlet portions and having a drive shaft substantially aligned with the longitudinal axis of the tubular housing;
fan means coupled to the drive shaft of the motor for rotation about said longitudinal axis and having a plurality of fan blades for moving air from said inlet portion to said outlet portion; and
a handle connected to the tubular housing and adapted to be grasped by the hand of the user so that in the normal operating position of the blower the tubular housing of the blower is suspended from the handle when in use.

71. The portable blower of claim 70 wherein said handle extends substantially parallel to the longitudinal axis of the housing.

72. The portable blower of claim 70 wherein said inlet portion is aligned with the longitudinal axis of said housing.

73. The portable blower of claim 72 wherein said inlet portion has a diametrically enlarged flared end portion.

74. The portable blower of claim 73 further including guard means located at the flared end portion for preventing manual access into the housing through said inlet portion.

75. The portable blower of claim 74 wherein the guard means presents a total open area at the flared end portion that is at least as great as the cross-sectional area of the tubular housing.

76. The portable blower of claim 70 wherein said elongated tubular housing has a substantially uniform diameter along substantially its entire length.

77. The portable blower of claim 76 wherein the elongated tubular housing extends a relatively short distance from the handle to the inlet portion and a substantially greater distance from the handle to the outlet portion.

78. The portable blower of claim 70 further including a DC energy cell electrically coupled to the drive motor for furnishing electrical energy thereto.

79. The blower of claim 55 wherein saaid inlet end is substantially aligned with said longitudinal axis of the tubular housing.

* * * * *

UNITED STATES PATENT AND TRADEMARK OFFICE
CERTIFICATE OF CORRECTION

PATENT NO. : 4,884,314                                Page 1 of 2

DATED : December 5, 1989

INVENTOR(S) : Jonathan L. Miner et al

It is certified that error appears in the above-identified patent and that said Letters Patent is hereby corrected as shown below:

Column 1, line 6, "surface" should be --surfaces--.

Column 5, line 61, "resepectively" should be --respectively--.

Column 6, line 28, "exahust" should be --exhaust--.

Column 6, line 45, "botton" should be --bottom--.

Column 7, line 27, "TThe" should be --The--.

Column 10, line 6, after "set" delete --up--.

Column 11, line 37, claim 1, "fans" should be --fan--.

Column 11, line 38, claim 1, after "inlet" insert --end--.

Column 11, line 43, claim 2, after "into" insert --the--.

UNITED STATES PATENT AND TRADEMARK OFFICE
CERTIFICATE OF CORRECTION

PATENT NO. : 4,884,314 (Page 2 of 2)

DATED : December 5, 1989

INVENTOR(S) : Jonathan L. Miner et al.

It is certified that error appears in the above-identified patent and that said Letters Patent is hereby corrected as shown below:

Column 13, line 39, claim 25, "ot" should be --to--.

Column 14, line 12, claim 30, "driven" should be --drive--.

Column 14, line 33, claim 32, "downward" should be --downwardly--.

Column 14, line 67, claim 41, "outlent" should be --outlet--.

Column 15, line 29, claim 43, after "inlet" insert --end--.

Column 15, line 37, claim 43, "detecting" should be --directing--.

Column 15, line 55, claim 43, "otor" should be --motor--.

Column 18, line 65, claim 79, "saaid" should be --said--.

Signed and Sealed this

First Day of January, 1991

*Attest:*

HARRY F. MANBECK, JR.

*Attesting Officer*      *Commissioner of Patents and Trademarks*